United States Patent
Wang et al.

(10) Patent No.: US 10,878,450 B1
(45) Date of Patent: Dec. 29, 2020

(54) PACING CONTENT CAMPAIGNS BY ADJUSTING PROBABILITY OF BIDDING

(71) Applicant: Facebook, Inc., Menlo Park, CA (US)

(72) Inventors: Haining Wang, Davis, CA (US); Perry Aaron Green, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 352 days.

(21) Appl. No.: 15/942,558

(22) Filed: Apr. 1, 2018

(51) Int. Cl.
*G06Q 30/00* (2012.01)
*G06Q 30/02* (2012.01)

(52) U.S. Cl.
CPC ..... *G06Q 30/0254* (2013.01); *G06Q 30/0249* (2013.01); *G06Q 30/0272* (2013.01); *G06Q 30/0275* (2013.01)

(58) Field of Classification Search
None
See application file for complete search history.

(56) References Cited

U.S. PATENT DOCUMENTS

| | | | | |
|---|---|---|---|---|
| 6,286,005 B1* | 9/2001 | Cannon | ........... | G06Q 30/02 455/2.01 |
| 6,317,732 B1* | 11/2001 | Inoue | ........... | G06Q 10/06 706/46 |
| 2003/0171990 A1* | 9/2003 | Rao | ........... | G06Q 30/0256 705/14.46 |
| 2010/0100471 A1* | 4/2010 | Li | ........... | G06Q 40/04 705/37 |
| 2012/0259489 A1* | 10/2012 | Hamamatsu | ........... | G05D 1/0206 701/21 |
| 2014/0252855 A1* | 9/2014 | Watanabe | ........... | H02J 3/00 307/31 |
| 2015/0058270 A1* | 2/2015 | Kawata | ........... | G06N 5/022 706/46 |
| 2015/0379562 A1* | 12/2015 | Spievak | ........... | H04M 3/5158 379/265.09 |
| 2016/0173693 A1* | 6/2016 | Spievak | ........... | H04M 3/42042 379/265.09 |

OTHER PUBLICATIONS

No Art Rejection!*
Gao; A Survey of Incentive Mechanisms for Participatory Sensing; IEEE 2015; pp. 918-921; 2015.*
Kridel; Adaptive Modeling for Real Time Analyti; CSS 2015; pp. 887-896; 2015.*

* cited by examiner

*Primary Examiner* — Radu Andrei
(74) *Attorney, Agent, or Firm* — Fenwick & West LLP

(57) ABSTRACT

A content provider specifies a content campaign along with a desired metric to achieve for the campaign, such as a budget. For each opportunity to present content to a user, an online publishing system selects content to a group of users using a selection process. To achieve the desired metric for the content campaign, the publishing system determines a probability of participating in the selection process with content from the content campaign based on feedback about the current performance of the campaign. For example, the system compares the opportunities passed and the budget spent for the content campaign to a current time and budget expenditure, and then it calculates an equilibrium probability that will achieve the desired budget at the end of the campaign. The system then determines whether to participate in a selection process for each new opportunity to present content using this adjusted equilibrium probability.

18 Claims, 3 Drawing Sheets

PACING CONTENT CAMPAIGNS BY ADJUSTING PROBABILITY OF BIDDING

BACKGROUND

This disclosure relates generally to online content distribution, and more specifically to pacing the distribution of online content to meet an overall target.

When initiating content campaigns to present content to users of an online system, the content provider may specify a metric to be tracked for the content campaign (e.g., a budget to be spent over a duration of time). In an example where the content provider is a sponsor of the content (e.g., by paying a publishing system to deliver the content to users of the system), the sponsor's content competes with other content for presentation to users. In this example, portions of the budget may be allocated to compete with the other content in a content selection process, such as an online auction. Traditionally, to achieve a desired total budget spent during a period of time, a pacing factor is used as a feedback mechanism to adjust the bid for content upwards or downwards in the auction. This adjustment increases or decreases the likelihood that the content will win the auction, which in turn affects the spending of the budget.

At times during the content campaign any change between a tracked spend and an actual spend results in over- or under-spending the specified budget. When the bid amount is too high, the content campaign may win too many auctions early in the time period for the campaign and at a higher value. When the bid amount is too low, time lapses in the time period for which no spending occurs, reducing the effective time period for the campaign and losing the opportunity to place content in the initial portion of the campaign's duration.

Changes to the budget of a content campaign may additionally influence the results of a content campaign. For example, a higher budget for a content campaign may result in a higher bid amount being allocated to each placement opportunity. The higher bid amount corresponds to the content campaign winning auctions for a different audience than the original bid amount at the original budget, and results in a biased audience for the content campaign. In particular, high or low bid amounts may correspond to different audiences among the users of the online system. For example, a low bid amount may win opportunities for placement associated with a different set of users than a high bid amount, resulting in a biased audience for the content campaign. This also means that when a budget is changed for a subsequent period of time, the audience may change because the different bid reaches different types of users. Accordingly, the results of a content campaign (e.g., the audience engagement with the content) are not predictable when the bid is changed.

SUMMARY

An online system calibrates the pacing of content in a content campaign by adjusting the probability that the content campaign will participate in opportunities to present content to viewing users. The probability of participating is adjusted to track a desired metric, such as a desired spending rate or budget for the campaign. Using the probability of participating as the variable for pacing instead of adjusting the bid amounts avoids influencing the audience to whom a content campaign is presented and biasing the content campaign's performance on the online system. Beneficially, this decouples the bid amount of content items from the budget of the content campaign and helps to maintain a more consistent audience for the content campaign throughout the duration of the campaign.

In various embodiments of the invention, the system determines an equilibrium probability for a content campaign at intervals during the time period of the content campaign. The equilibrium probability represents a probability of bidding at which the content campaign spends its budget evenly for the duration of the campaign. For each period in the content campaign, the system calculates the equilibrium probability based on the number of effective opportunities past for the content campaign and the fraction of the budget spent during the previous time period, across a number of most recent time periods. Based on the current budget spend of the content campaign, the system determines a future time at which the budget spending rate should intercept the budget curve of the content campaign and adjusts the probability of bidding. For example, the equilibrium probability of a content campaign in which the fraction of the spent budget exceeds the desired spending rate is adjusted downwards so that the content campaign will compete for fewer placement opportunities for a period of time. In another example, the equilibrium probability of a content campaign in which the fraction of the spent budget is too low for the desired spending rate is adjusted upward so that the content campaign will compete for more placement opportunities for a period of time.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
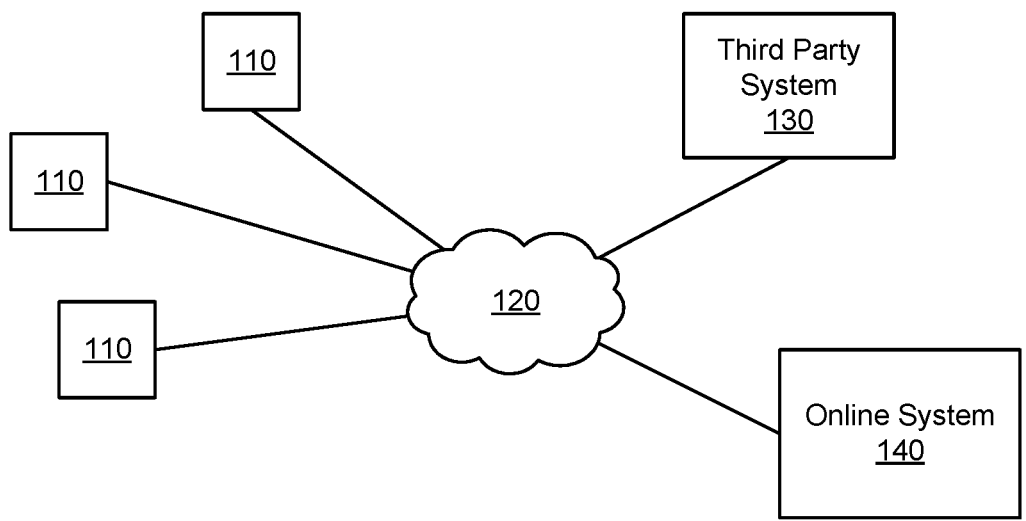
FIG. 1 is a block diagram of a system environment in which an online system operates, in accordance with an embodiment.

FIG. 1 is a block diagram of a system environment 100 for an online system 120. The system environment 100 shown by FIG. 1 comprises one or more client devices 110, a network 115, the online system 120, and one or more third party systems 130. In alternative configurations, different and/or additional components may be included in the system environment 100. For example, the online system 120 is a social networking system, a content sharing network, or another system providing content to users.

The client devices 110 are one or more computing devices capable of receiving user input as well as transmitting and/or receiving data via the network 115. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 115. In one embodiment, a client device 110 executes an application allowing a user of the client device 110 to interact with the online system 120. For example, a client device 110 executes a browser application to enable interaction between the client device 110 and the online system 120 via the network 115. In another embodiment, a client device 110 interacts with the online system 120 through an application programming interface (API) running on a native operating system of the client device 110, such as IOS® or ANDROID™.

The client devices 110 are configured to communicate via the network 115, which may comprise any combination of local area and/or wide area networks, using both wired and/or wireless communication systems. In one embodiment, the network 115 uses standard communications technologies and/or protocols. For example, the network 115 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 115 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 115 may be represented using any suitable format, such as hypertext markup language (HTML) or extensible markup language (XML). In some embodiments, all or some of the communication links of the network 115 may be encrypted using any suitable technique or techniques.

One or more third party systems 130 may be coupled to the network 115 for communicating with the online system 120, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 120, such as advertisements, content, or information about an application provided by the third party system 130.

Figure 2:
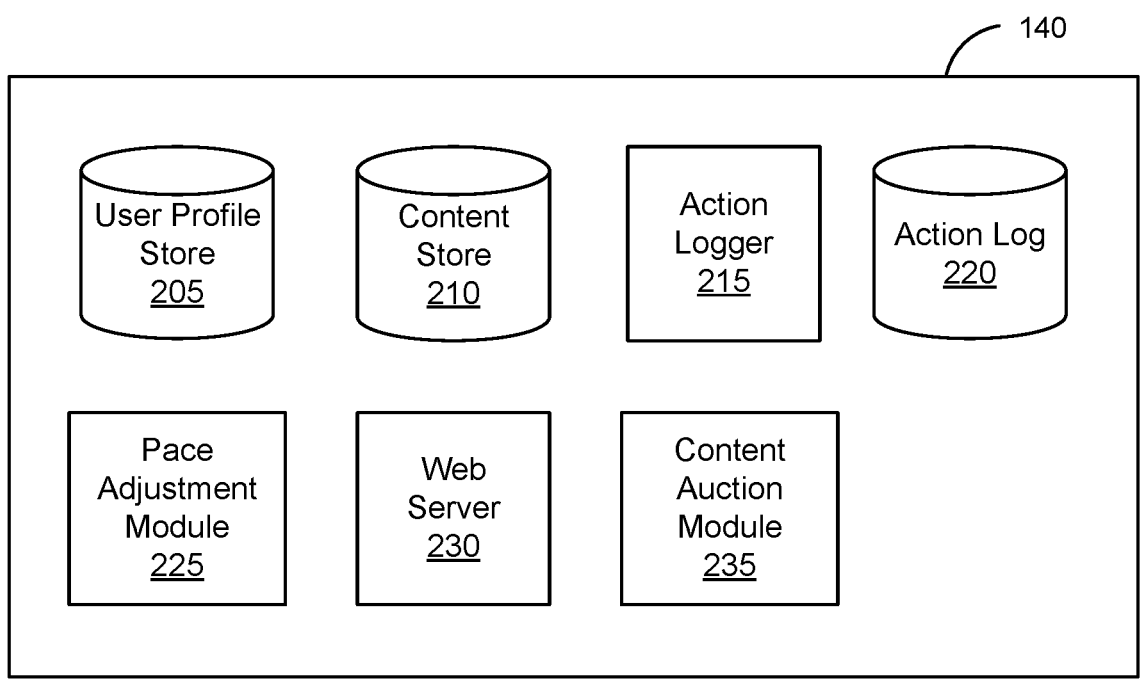
FIG. 2 is a block diagram of an architecture of the online system, in accordance with an embodiment.

FIG. 2 is a block diagram of an architecture of the online system 140. The online system 140 shown in FIG. 2 includes a user profile store 205, a content store 210, an action logger 215, an action log 220, a pace adjustment module 225, a content auction module 230, and a web server 235. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 210 include content for presentation to a user and a bid amount. The content is text, image, audio, video, or any other suitable data presented to a user. In various embodiments, the content also specifies a page of content. For example, a content item includes a landing page specifying a network address of a page of content to which a user is directed when the content item is accessed. The bid amount is included in a content item by a user and is used to determine an expected value, such as monetary compensation, provided by an advertiser to the online system 140 if content in the content item is presented to a user, if the content in the content item receives a user interaction when presented, or if any suitable condition is satisfied when content in the content item is presented to a user. For example, the bid amount included in a content item specifies a monetary amount that the online system 140 receives from a user who provided the content item to the online system 140 if content in the content item is displayed. In some embodiments, the expected value to the online system 140 of presenting the content from the content item may be determined by multiplying the bid amount by a probability of the content of the content item being accessed by a user.

In various embodiments, a content item includes various components capable of being identified and retrieved by the online system 140. Example components of a content item include: a title, text data, image data, audio data, video data, a landing page, a user associated with the content item, or any other suitable information. The online system 140 may retrieve one or more specific components of a content item for presentation in some embodiments. For example, the online system 140 may identify a title and an image from a content item and provide the title and the image for presentation rather than the content item in its entirety.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Additionally, a content item may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In various embodiments, the content store 210 includes multiple campaigns, which each include one or more content items. In various embodiments, a campaign is associated with one or more characteristics that are attributed to each content item of the campaign. For example, a bid amount associated with a campaign is associated with each content item of the campaign. Similarly, an objective associated with a campaign is associated with each content item of the campaign. In various embodiments, a user providing content items to the online system 140 provides the online system 140 with various campaigns each including content items having different characteristics (e.g., associated with different content, including different types of content for presentation), and the campaigns are stored in the content store.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

The pace adjustment module 225 regulates presentation of content from content campaigns to online system users so that an objective associated with the content campaign is satisfied throughout the time period associated with the content campaign. The pace adjustment module 225 adjusts the pacing during the content campaign based on the current spending of the campaign and the amount of time remaining in the campaign by adjusting a probability of bidding. The probability of bidding adjusts a likelihood that, for a particular opportunity to present content to a viewing user, the content campaign will compete for presentation. In various embodiments, content campaigns or content items in content campaigns are associated with a bid amount for an action associated with the campaign, which is held constant as the probability of bidding is adjusted. In one embodiment, the pace adjustment module 225 determines a probability of bidding associated with content from a content campaign during an interval of the content campaign's duration. For example, the pace adjustment module 225 determines a probability of bidding from the budget associated with the content campaign and an amount spent by a sponsor on the content campaign from a start date of the content campaign to a current time. The probability of bidding may be modified at various intervals, allowing the pace adjustment module 225 to modify how the content campaign's budget is used throughout the content campaign's duration.

The content auction module 230 receives content from one or more content campaigns and ranks the received content based on their associated bid amounts when an opportunity to present content is identified. The content auction module may also determine the bid amounts for the content campaigns. For example, the content auction module 230 ranks the received advertisements based on their associated expected values, which are based at least in part on the bid amounts associated with the content, where content associated with larger expected values have a higher position in the ranking. To determine the bid amounts, the content auction module may apply predictive models of user behavior to determine the user's expected likelihood of performing the action associated with a campaign. The content auction module selects one or more content items based on the ranking, and the selected content is presented to an online system user. For example, the content auction module 230 selects content having the highest position in the ranking or having at least a threshold position in the ranking. In other embodiments, the content auction module 230 may use any other suitable method to select content for presentation to an online system user.

The web server 235 links the online system 140 via the network 120 to the one or more client devices 110, as well as to the one or more third party systems 130. The web server 235 serves web pages, as well as other content, such as JAVA®, FLASH®, XML and so forth. The web server 235 may receive and route messages between the online system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOS®, ANDROID™, or BlackberryOS.

Pacing Content Campaigns by Adjusting the Probability of Bidding

When a content campaign is presented, sponsors identify a budget and a duration (e.g., a start and end time, defining a time period) for the campaign. In one embodiment, the content campaign is additionally associated with a bid amount. It may be desirable to the sponsor that the online system ensures that the content campaign budget be spent smoothly for the duration of the content campaign. Over-spending may occur when the content campaign wins too many opportunities for presentation early in the campaign, and this may result in the budget being spent before the end of the campaign. Similarly, underspending may occur when the content campaign does not win enough opportunities for presentation, and may result in the excess budget at the end of the content campaign. In each case, the content of the content campaign is not presented smoothly for the duration of the campaign. To avoid this, the system identifies a spending rate based on the budget and duration of the content campaign, which can be represented graphically as a budget curve, to determine an expected budget expenditure for each period of time within the duration of the campaign.

Rather than achieve a desired budget by adjusting a bid amount for each opportunity to present content to a user, the system determines a probability of participating in a selection process (e.g., bidding in an auction) for the opportunities. The probability of bidding determines the likelihood that the content campaign will compete for placement in an opportunity when an opportunity arises. However, a probability of bidding that would effectively present the content of the content campaign consistent with the desired spending rate of the campaign may be unknown, or may change over the duration of the content campaign. For example, the budget expenditure may over- or under-shoot the desired spending rate of the campaign during the time period of the campaign, necessitating adjustments to accommodate the fluctuation. In another example, a sponsor may increase or decrease the budget for a content campaign partway through the duration of the content campaign, causing the system to adjust the spending rate to achieve the new desired budget.

A probability of bidding is determined for a content campaign for a time period within the duration of the content campaign. The system identifies the effective opportunities passed for the time period. The effective opportunities passed represents the fraction of opportunities in which the content campaign competed for placement, regardless of whether or not the content in the content campaign was successfully displayed to a viewing user. The system stores for each time period in the duration of the content campaign the associated effective opportunities passed of that time period. In one embodiment, the system additionally stores for each time period the budget spent during that time period. The number of effective opportunities passed during a period can be computed by the formula:

$$\text{effective opportunities passed} = \frac{\text{exposed during period}}{\text{total opportunities per duration}},$$

where exposed during period=opportunities*probability of bidding.

As shown, the effective opportunities passed may be computed as the number of opportunities to which the content campaign was exposed during the time period divided by the predicted total opportunities for the duration of the content campaign. The number of opportunities to which the content campaign was exposed during the time period is calculated as the total number of opportunities passed during the time period multiplied by the probability of bidding associated with the content campaign during that time period. For example, a content campaign with a bidding probability of 0.50 would be exposed to 50 opportunities in a time period in which 100 opportunities existed. If the time period represented half of the total duration of the content campaign, the predicted number of total opportunities might be 200, resulting in an effective opportunities past of 50/200 or 0.25.

The effective opportunities passed of the current time period and the past time periods are then used to determine the estimated equilibrium probability for the content campaign. The estimated equilibrium probability of the content campaign represents the probability for bidding at which the system expects to achieve the desired spending rate shown in the budget curve. In one embodiment, the equilibrium probability does not change more than a threshold amount over the duration of the content campaign, but is adjusted within the threshold amount based on the effective opportunities past and budget of each subsequent time period that passes. In one embodiment, the equilibrium probability is determined using the formula:

$$\text{equilibrium probability} = \frac{\sum (\text{effective opportunities passed})_i}{\sum (\text{fraction of budget used})_i}.$$

As shown, the equilibrium probability is calculated as the sum of the effective opportunities past for the previous and current time periods divided by the sum of the fractions of the budget spent for the previous and current time periods.

The equilibrium probability results in an estimated spending rate that follows the budget curve. However, it is frequently the case that the real-time output probability is adjusted by the system to accommodate the content campaign over- or under-shooting the budget curve. In one embodiment, the system determines an adjustment based on the deviation of the budget expenditure with the budget curve and on a selected future point at which the content campaign expenditure intersects with the budget curve. For example, for a content campaign in which the budget is overspent, the real-time output probability is adjusted downward such that the budget expenditure for the content campaign intersects with the budget curve at a future time. In another example, for a content campaign in which the budget is underspent, the output probability is adjusted upward. In each case, the budget expenditure is expected to align with the budget curve at a future time.

In a case where the budget associated with the content campaign is changed (e.g., a sponsor increases or decreases the budget during the time period of the content campaign), the equilibrium probability is scaled by a scaling amount. In one embodiment, the scaling amount is limited to a maximum of the inverse of the equilibrium probability to ensure that the performance and results of the content campaign are not affected.

The system recalculates the equilibrium probability and an adjustment for the equilibrium probability at intervals throughout the duration of the content campaign. In one embodiment, the length of the intervals is chosen to ensure that latency does not impact the calculated probability. For example, spend of the budget may not occur immediately when a content campaign successfully competes in an opportunity, and intervals that are too short may separate an exposed opportunity from the associated budget spend. In one embodiment, the intervals are chosen at least in part based on the objectives associated with the content campaign. For example, a content campaign in which an impression triggers spend of the budget may have an interval of 3 minutes, while a content campaign in which a conversion triggers spend of the budget may have a longer interval.

Additionally, in one embodiment, the system may use a paced bid in conjunction with a calculated equilibrium probability. In this embodiment, the paced bid is adjusted slowly relative to the probability of bidding.

Figure 3A:
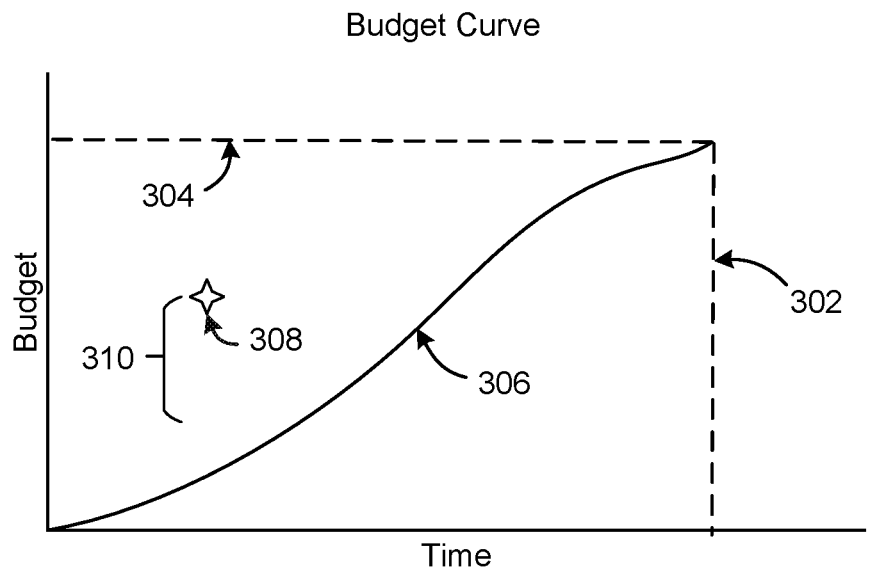
FIGS. 3A-3B are example graphs illustrating the pacing of a content campaign in comparison to a generated budget curve, in accordance with an embodiment.
Figure 3B:
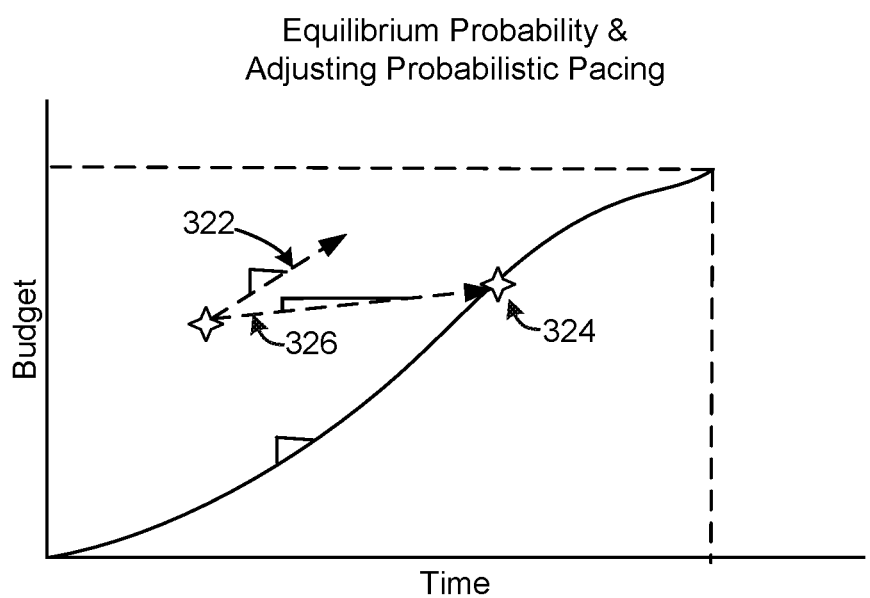

FIG. 3A-3B are example graphs illustrating the pacing of a content campaign using a probability of bidding based on a budget curve. A content campaign is associated with a budget 302 and a duration 304. Based on the budget 302 and the duration 304, the system 130 determines a budget curve 306. In one embodiment, the budget curve 306 illustrates an ideal spending rate in which the budget 302 of the content campaign is evenly spent over the duration 304 of the content campaign.

FIG. 3A is an example illustrating a current time in the duration 304 of a content campaign. An amount of budget has been spent at the current time, shown by a point 308. The amount of budget indicated by point 308 deviates from the ideal budget curve 306 determined by the system 130 by an amount 310. As shown, the point 308 indicate overspend of the budget for the current time period by an amount 310. In another example, the budget might be underspent for the current time period by an amount.

FIG. 3B is an example illustrating the determination of an equilibrium probability and the adjustment of the probability of bidding associated with a content campaign. The system calculates an equilibrium probability 322. In one embodiment, the slope of the spending rate associated with the equilibrium probability 322 is the same as the slope of the budget curve 306. Because the current budget and time, shown by point 308 in FIG. 3A, deviates from the ideal budget curve 306, the system determines an adjustment to the equilibrium probability 322. The system identifies a point 324 at a future point in the duration of the content campaign at which the budget expenditure of the campaign should intersect the budget curve. Based on the future point 324, the current point 308, and the identified equilibrium probability 322, the system determines an adjustment 326 that corresponds to the spending rate necessary to intersect the future point 324. In one example, the adjusted probability is determined using the formula:

$$\text{adjusted probability} = \text{equilibrium probability} \times \frac{\Delta(\text{fraction budget})}{\Delta(\text{opportunities passed})}$$

As shown, the adjusted probability is calculated by multiplying the equilibrium probability 322 by the difference in the fraction of the budget at the future point on the budget curve 324 and the current point 308 divided by the difference in the fraction of opportunities passed at the future point on the budget curve 324 and the current point 308.

Figure 4:
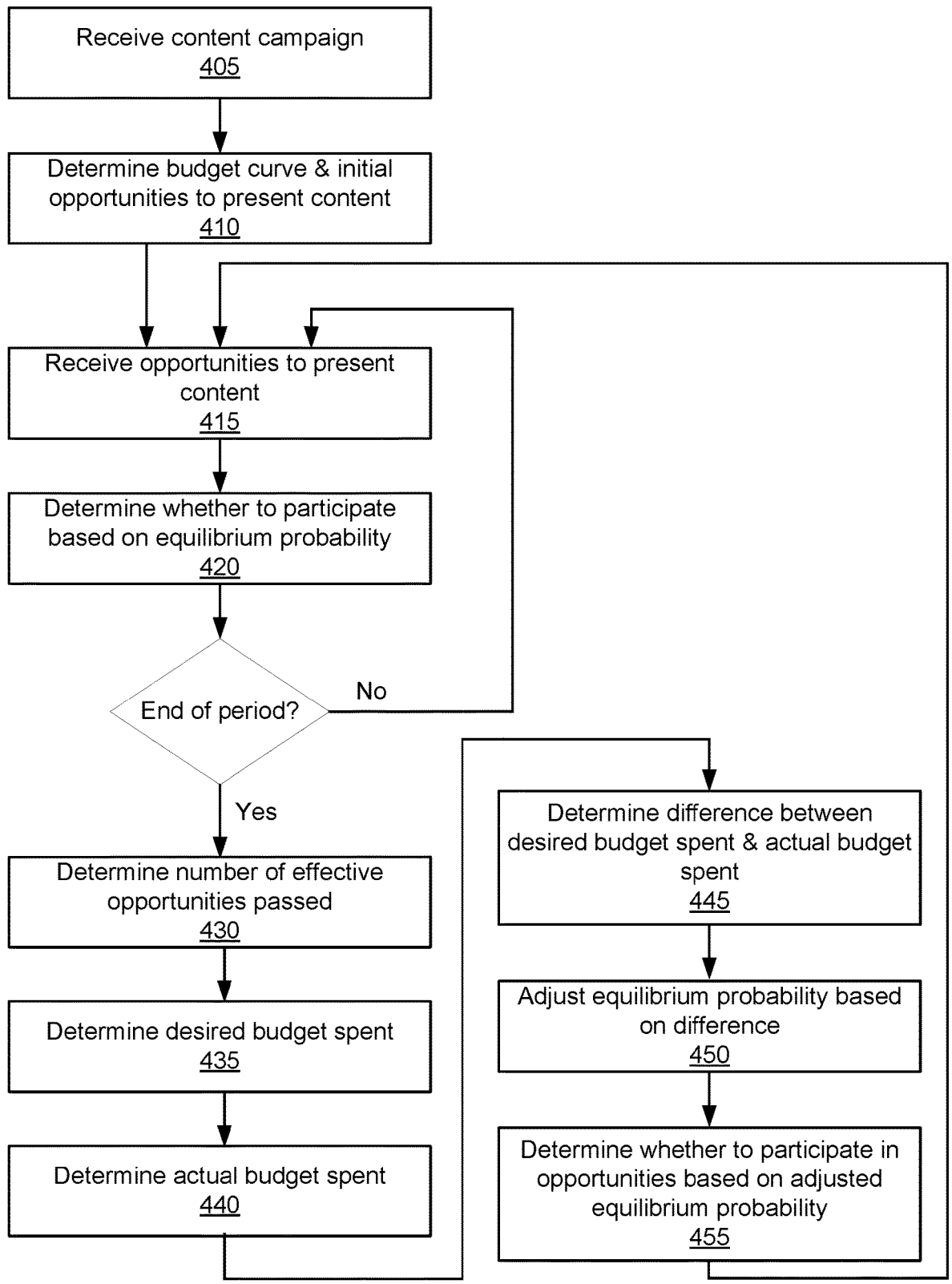
FIG. 4 is a flow diagram of a method for pacing a content campaign by adjusting the probability of bidding, in accordance with an embodiment.

FIG. 4 is a flow diagram of a method for pacing a content campaign by adjusting the probability of bidding. In various embodiments, the method may include different and/or additional steps than those described in conjunction with FIG. 4.

An online system 140 receives 405 a content campaign including a budget and a duration. The content campaign may further include one or more objectives, targeting criteria, a bid amount, or other information associated with the content in the content campaign. To ensure that the budget is spent evenly over the duration of the content campaign, the system 140 determines 410 a goal budget curve. The goal budget curve relates a cumulative fraction of budget spent over time, where the budget curve reaches the target budget upon completion of the time period of the content campaign, and represents an ideal budget spend for the content campaign. The online system 140 receives 415 a plurality of opportunities to present content to a user of the online system, and determines 420 whether to participate in a selection process for the received opportunities, based at least in part on a rate determined by an equilibrium probability.

For each of a plurality of time periods within the overall time period of the content campaign, the system determines 430 a number of effective opportunities passed during the previous time periods of the content campaign. The system 140 then determines 435 a desired budget spent over the previous periods of the content campaign. The desired budget spent is determined based on the calculated budget curve and represents a cumulative amount of budget to reach the target budget upon completion of the duration of the content campaign. The system 140 determines 440 the actual budget spent during the previous periods of the content campaign, and determines 445 the difference between the desired budget spent and the actual budget spent during the previous periods of the content campaign. Based on the difference between the desired budget spent and the actual budget spent, the system 140 adjusts 450 the equilibrium probability associated with the content campaign. During the time period, the system 140 determines 455 whether to participate in each of a plurality of opportunities to select content for one or more users of the online system based on the rate specified by the adjusted equilibrium probability.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method executed by an online system, the method comprising:
   receiving, at the online system, a content campaign that includes a target budget and a duration for spending the target budget;
   determining a goal budget curve that relates a cumulative budget spent over time, where the budget curve reaches the target budget upon completion of the duration of the content campaign, the budget curve associated with an equilibrium probability of bidding for achieving the goal budget curve;
   receiving a plurality of opportunities to present content to a user of the online system;
   selecting a subset of the opportunities at a rate according to the equilibrium probability;
   for each of the selected opportunities, participating in a selection process with content from the content campaign, where the selection process determines a content item to provide in response to the opportunity to present content to a user of the online system;
   determining a plurality of periods during the duration of the content campaign; and
   for each of the plurality of periods:
      determining a number of effective opportunities that have passed during the previous periods of the content campaign;
      determining a desired budget spent over the previous periods of the content campaign according to the budget curve;
      determining an actual amount of the budget spent during the previous periods of the content campaign;
      determining a difference between the desired budget spent and the actual budget spent during the previous periods of the content campaign;
      adjusting the equilibrium probability based on the determined difference; and
      determining, during the period, whether to participate in each of a plurality of opportunities to select content for one or more users of an online system at a rate according to the adjusted equilibrium probability.

2. The method of claim 1, wherein the adjusted equilibrium probability is determined using a ratio of the effective opportunities passed and the actual budget spent for the previous periods.

3. The method of claim 1, wherein the number of effective opportunities passed is determined using a ratio of a number of opportunities associated with the content campaign during the period and an estimated total number of opportunities for the duration of the campaign.

4. The method of claim 1, wherein a bid amount associated with content in the content campaign is adjusted based at least in part on the budget of the content campaign and the duration of the content campaign, the bid amount adjusted at a lower frequency than the equilibrium probability.

5. The method of claim 1, wherein determining a probability adjustment further comprises:
   identifying a point on the budget curve at a future time within the duration of the content campaign;
   determining a probability adjustment, the probability adjustment determined to intersect the identified point on the budget curve.

6. The method of claim 1, wherein responsive to the budget of the content campaign being modified during the duration of the content campaign, the calculated equilibrium probability is adjusted by a scaling factor.

7. The method of claim 6, wherein the scaling factor is less than the inverse of the equilibrium probability.

8. The method of claim 1, wherein the estimated equilibrium probability represents a spending rate that approximates the slope of the budget curve.

9. The method of claim 1, wherein adjusting the estimated equilibrium probability is performed iteratively during the duration of the content campaign.

10. A non-transitory computer-readable storage medium storing computer program instructions executable by a processor to perform operations comprising:
   receiving, at an online system, a content campaign that includes a target budget and a duration for spending the target budget;
   determining a goal budget curve that relates a cumulative budget spent over time, where the budget curve reaches the target budget upon completion of the duration of the content campaign, the budget curve associated with an equilibrium probability of bidding for achieving the goal budget curve;
   receiving a plurality of opportunities to present content to a user of the online system;
   selecting a subset of the opportunities at a rate according to the equilibrium probability;
   for each of the selected opportunities, participating in a selection process with content from the content campaign, where the selection process determines a content item to provide in response to the opportunity to present content to a user of the online system;
   determining a plurality of periods during the duration of the content campaign; and
   for each of the plurality of periods:
      determining a number of effective opportunities that have passed during the previous periods of the content campaign;
      determining a desired budget spent over the previous periods of the content campaign according to the budget curve;
      determining an actual amount of the budget spent during the previous periods of the content campaign;
      determining a difference between the desired budget spent and the actual budget spent during the previous periods of the content campaign;
      adjusting the equilibrium probability based on the determined difference; and
      determining, during the period, whether to participate in each of a plurality of opportunities to select content for one or more users of an online system at a rate according to the adjusted equilibrium probability.

11. The computer-readable storage medium of claim 10, wherein the adjusted equilibrium probability is determined using a ratio of the effective opportunities passed and the actual budget spent for the previous periods.

12. The computer-readable storage medium of claim 10, wherein the number of effective opportunities passed is determined using a ratio of a number of opportunities associated with the content campaign during the period and an estimated total number of opportunities for the duration of the campaign.

13. The computer-readable storage medium of claim 10, wherein a bid amount associated with content in the content campaign is adjusted based at least in part on the budget of the content campaign and the duration of the content campaign, the bid amount adjusted at a lower frequency than the equilibrium probability.

14. The computer-readable storage medium of claim 10, wherein determining a probability adjustment further comprises:
   identifying a point on the budget curve at a future time within the duration of the content campaign;
   determining a probability adjustment, the probability adjustment determined to intersect the identified point on the budget curve.

15. The computer-readable storage medium of claim 10, wherein responsive to the budget of the content campaign being modified during the duration of the content campaign, the calculated equilibrium probability is adjusted by a scaling factor.

16. The computer-readable storage medium of claim 15, wherein the scaling factor is less than the inverse of the equilibrium probability.

17. The computer-readable storage medium of claim 10, wherein the estimated equilibrium probability represents a spending rate that approximates the slope of the budget curve.

18. The computer-readable storage medium of claim 10, wherein adjusting the estimated equilibrium probability is performed iteratively during the duration of the content campaign.

* * * * *